US011733957B2

(12) United States Patent
Varghese et al.

(10) Patent No.: US 11,733,957 B2
(45) Date of Patent: Aug. 22, 2023

(54) REAL TIME SHARING OF RELEVANT INFORMATION IN VIRTUAL MEETINGS

(71) Applicant: INTERNATIONAL BUSINESS MACHINES CORPORATION, Armonk, NY (US)

(72) Inventors: Sneha Mary Varghese, Fishkill, NY (US); Esteban Arias-Navarro, Cary, NC (US); Jones Ahoi, Ann Arbor, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 17/448,917

(22) Filed: Sep. 27, 2021

(65) Prior Publication Data
US 2023/0100862 A1   Mar. 30, 2023

(51) Int. Cl.
G06F 3/00      (2006.01)
G06F 3/14      (2006.01)
H04L 65/403    (2022.01)

(52) U.S. Cl.
CPC .......... *G06F 3/1454* (2013.01); *H04L 65/403* (2013.01)

(58) Field of Classification Search
CPC .............. G06Q 30/02; G06Q 30/0243; H04N 21/23412; H04N 21/4314; H04N 21/4316; H04N 21/44008; H04N 21/458; H04N 21/466; H04N 21/47205; H04N 21/4722; H04N 21/4725; H04N 21/812; H04N 21/8547; H04N 21/858
See application file for complete search history.

(56) References Cited

U.S. PATENT DOCUMENTS

| 8,914,452 | B2  | 12/2014 | Boston |
| 2014/0108506 | A1 | 4/2014 | Borzycki |
| 2014/0281855 | A1 | 9/2014 | Bhatnagar |
| 2015/0081617 | A1* | 3/2015 | Shaik ................. G06Q 30/0241 707/602 |
| 2015/0237082 | A1 | 8/2015 | Duong |

(Continued)

FOREIGN PATENT DOCUMENTS

CN      104601641 B    4/2018

OTHER PUBLICATIONS

Disclosed Anonymously, "System and Method for Enabling Interactivity with Shared Content," IP.com, IP.com No. IPCOM000263239D, IP.com Publication Date: Aug. 10, 2020, 5 pages.

(Continued)

*Primary Examiner* — Insa Sadio
(74) *Attorney, Agent, or Firm* — David Spalding (57) ABSTRACT

A computer-implemented method, a computer system and a computer program product distribute content in a virtual meeting session. The method includes extracting a plurality of embedded graphics from a presentation. The embedded graphics are selected from a group consisting of web links, images and video data. The method also includes transmitting the plurality of embedded graphics to a participant computing device. Lastly, the method includes displaying a virtual meeting dashboard that includes the plurality of embedded graphics.

20 Claims, 5 Drawing Sheets

(56) References Cited

U.S. PATENT DOCUMENTS

| | | | |
|---|---|---|---|
| 2015/0326925 A1* | 11/2015 | Ozkan | H04N 21/466 725/36 |
| 2017/0046314 A1 | 2/2017 | Chitta | |
| 2019/0356709 A1* | 11/2019 | Zlatarev | G06F 3/0481 |
| 2021/0064912 A1* | 3/2021 | Ono | G06F 18/2431 |
| 2021/0097125 A1 | 4/2021 | Khanna | |

OTHER PUBLICATIONS

Mircosoft, "Remove personal data from files," Microsoft Support, Accessed: Aug. 9, 2021, Retrieved from the Internet: https://support.microsoft.com/en-us/office/remove-personal-information-from-your-presentation-2b3bf84a-1960-4b3f-8d68-dbdaa8865e97, 4 pages.

Mell et al., "The NIST Definition of Cloud Computing", National Institute of Standards and Technology, Special Publication 800-145, Sep. 2011, 7 pages.

* cited by examiner

REAL TIME SHARING OF RELEVANT INFORMATION IN VIRTUAL MEETINGS

BACKGROUND

Embodiments relate generally to virtual meeting environments, and more specifically, to sharing relevant information in real time among participants of a virtual meeting.

Collaboration with others in a professional or personal setting using videotelephony services on the Internet and/or conducting "virtual meetings" may be popular. Videotelephony may enable the reception and transmission of audio-video signals by users in different locations, thereby providing a means to communicate video and voice between people in real time. Each meeting participant may communicate a video image of themselves along with audio of their voice using a personal computing device, such as a smart phone, tablet computing device, or personal computer. Each person attending a virtual meeting may participate from any chosen location such as an office location or from home. Virtual meeting software applications may include a dashboard display with audio and video from participants, as well as information that is relevant about the virtual meeting and its participants.

SUMMARY

The method may include extracting a plurality of embedded graphics from a presentation at a presenter computing device. The embedded graphics are selected from a group consisting of web links, images and video data. The method may also include transmitting the plurality of embedded graphics to a participant computing device. Lastly, the method may include displaying a virtual meeting dashboard. The virtual meeting dashboard may include the plurality of embedded graphics.

In an alternative embodiment, extracting the plurality of embedded graphics from the presentation may include determining whether each of the plurality of embedded graphics includes sensitive information and may also include extracting the embedded graphic in response to an embedded graphic within the plurality of embedded graphics not including the sensitive information.

In another embodiment, the method may include determining a type of embedded graphic for each of the plurality of embedded graphics included in the presentation and may also include storing the determined type as metadata associated with the embedded graphic.

In a further embodiment, determining the type of embedded graphic may include using a machine learning model to classify the embedded graphic by the determined type.

In yet another embodiment, transmitting the plurality of embedded graphics to the participant computing device may occur when the participant computing device connects to the virtual meeting session.

In another embodiment, displaying the virtual meeting dashboard may include receiving a preferred type of embedded graphic from a participant and comparing the preferred type and the type of embedded graphic for each of the plurality of embedded graphics. Lastly, in this embodiment, displaying the virtual meeting dashboard may include displaying the embedded graphic in the virtual meeting dashboard in response to the preferred type matching the type of embedded graphic.

In a further embodiment, displaying the virtual meeting dashboard may include obtaining a screen image of the participant computing device and determining whether the screen image includes the embedded graphic. Lastly, in this embodiment, displaying the virtual meeting dashboard may include displaying the embedded graphic in the virtual meeting dashboard in response to the screen image including the embedded graphic.

In addition to a computer-implemented method, additional embodiments are directed to a system and a computer program product for dynamically identifying a shared document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As remote work and global collaboration grow, the use of collaboration tools such as video conferencing and virtual meetings may become more prevalent. During virtual meetings, a presenter may share the screen of their computing device and display a presentation that they have created that may include tables or graphics or web links, among other things. The presenter may share the documents in advance but if not, it can be frustrating for participants who would like to review material covered or view additional content from the document that was not displayed on the shared screen. If web links are being shared, participants may have to copy them down manually or ask the presenter or other participants to copy the link into a text chat function, where the participant may then have the web links being referred to in the presentation. These requirements may result in the participant(s) missing key information, thereby wasting valuable collaboration time together and reducing productivity in meetings.

Therefore, it may be advantageous to, among other things, have a way for meeting participants to have the content within a presentation sent to them in advance automatically if the presenter or host of the virtual meeting has not done so and/or present to participants in the virtual meeting a customizable view of the relevant content within a presentation so that participants are not required to search for such content manually in local or cloud storage or ask for content to be forwarded to them, either as a link in a text conversation or an email of a specific graphic file or the presentation itself. Such a method may improve the technical capability of either or both of software applications that may be used to create presentations and other meeting content and virtual meeting software applications. Such a method may also enhance professional and personal productivity in virtual meetings.

Figure 1:
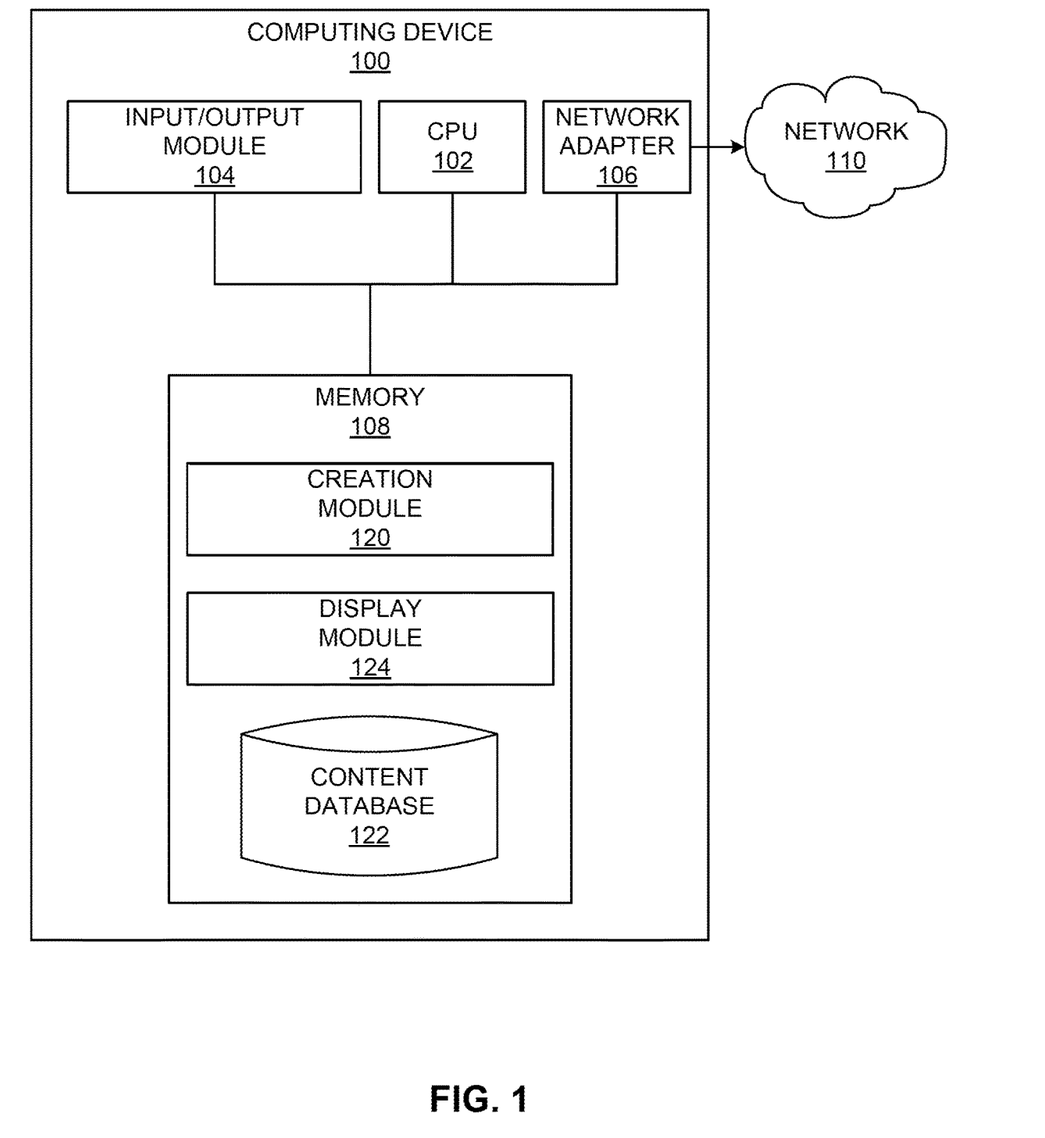
FIG. 1 depicts a block diagram of internal and external components of the computers and servers depicted in FIG. 2, according to at least one embodiment.

Referring to FIG. 1, a block diagram of a computing device 100, in which processes involved in the embodiments described herein may be implemented, is shown. Examples of computing systems, environments, and/or configurations that may be represented by the computing device 100 include, but are not limited to, personal computer systems, server computer systems, thin clients, thick clients, handheld or laptop devices, microprocessor-based systems, network PCs, minicomputer systems, and distributed cloud computing environments that include any of the described systems or devices. Computing device 100 may include one or more central processor units (CPUs) 102, input/output module 104, network adapter 106 and memory 108. CPU 102 executes program instructions in order to carry out the functions of the present communications systems and methods. FIG. 1 illustrates an embodiment in which computing device 100 is implemented as a computer system with a single processor, in which the CPU 102 utilizes system resources, such as memory 108, input/output y 104, and network adapter 106. However, the present communications systems and methods also include embodiments in which computing device 100 may be implemented as a plurality of networked computer systems, which may be multi-processor computer systems.

Input/output module 104 provides the capability to input data to, or output data from, computing device 100. For example, input/output module 104 may include input devices, such as keyboards, mice, touchpads, trackballs, scanners, analog to digital converters, etc., output devices, such as video adapters, monitors, printers, etc., and input/output devices, such as, modems, etc. Each computing device 100 also includes a network adapter 106 such as TCP/IP adapter cards, wireless Wi-Fi interface cards, or 3G or 4G wireless interface cards or other wired or wireless communication links. The creation module 120 or display module 124, as well as the virtual meeting application 206, may communicate with external computers via a network 110, which may be any public or proprietary LAN or WAN, including, but not limited to the Internet, and respective network adapters or interfaces.

Memory 108 stores program instructions that are executed by, and data that are used and processed by, CPU 102 to perform the functions of computing device 100. Memory 108 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an Integrated Drive Electronics (IDE) interface, or a variation or enhancement thereof, such as enhanced IDE (EIDE) or Ultra-Direct Memory Access (UDMA), or a Small Computer System Interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a Fibre Channel-Arbitrated Loop (FC-AL) interface.

Figure 2:
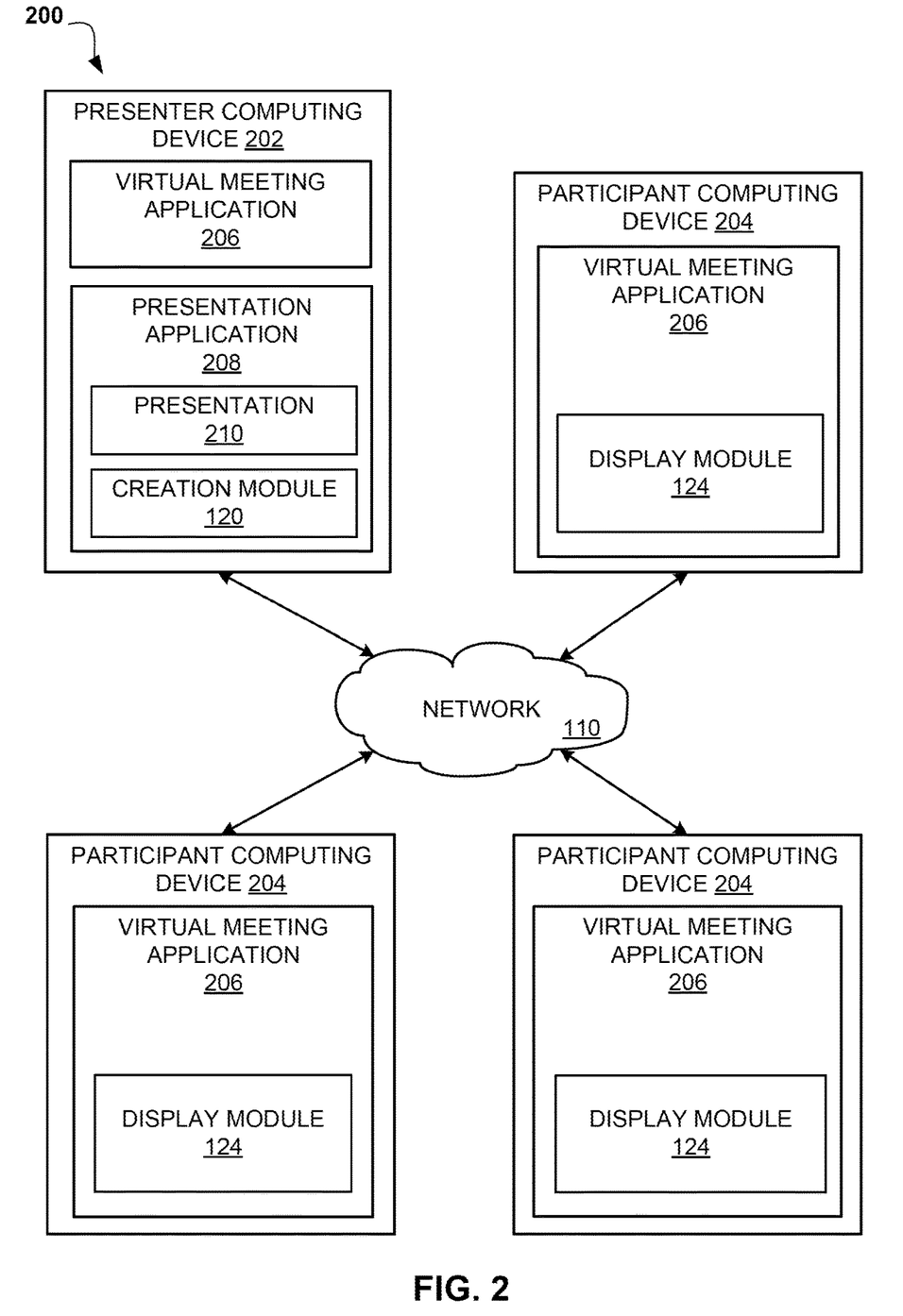
FIG. 2 depicts a block diagram of a computing environment that may be used to create a presentation during setup of a virtual meeting and also conduct a virtual meeting session over the network, according to an exemplary embodiment.

The contents of memory 108 may vary depending upon the function that computing device 100 is programmed to perform. In the example shown in FIG. 1, example memory contents are shown representing routines and data for embodiments of the processes described herein. However, it may be recognized that these routines, along with the memory contents related to those routines, may not be included on one system or device, but rather may be distributed among a plurality of systems or devices, based on well-known engineering considerations. The present communications systems and methods may include any and all such arrangements. In an example of the creation of a presentation or other content for display in a virtual meeting on computing device 100, memory 108 may include presentation application 208, which may also include creation module 120, as shown in the configuration of FIG. 2. For examples in which computing device 100 connects to a virtual meeting using virtual meeting application 206, display module 124 may be loaded into memory 108. In both examples, either creation module 120 or display module 124 may access content database 122 to either read or write into the database and facilitate either the distribution or display of content from a presentation to participants of a virtual meeting. One of ordinary skill in the art may also recognize that the modules displayed in FIG. 1 are not the only modules that may be loaded in memory 108. Only those modules needed for one potential embodiment are shown for illustrative brevity.

Referring to FIG. 2, a block diagram of a computing environment that may be used to create a presentation during setup of a virtual meeting and also conduct a virtual meeting session, according to at least one embodiment. The networked computer environment 200 may include a presenter computing device 202 and one or more participant computing devices 204, interconnected via a communication network 240. According to at least one implementation, the networked computer environment 200 may include a plurality of participant computing devices 204 of which only three are shown.

The communication network 110 may include various types of communication networks, such as a wide area network (WAN), local area network (LAN), a telecommunication network, a wireless network, a public switched network and/or a satellite network. The communication network 110 may include connections, such as wire, wireless communication links, or fiber optic cables. The network 110 may also include additional hardware not shown such as routers, firewalls, switches, gateway computers and/or edge servers. It may be appreciated that FIG. 2 provides only an illustration of one implementation and does not imply any limitations with regard to the environments in which different embodiments may be implemented. Many modifications to the depicted environments may be made based on design and implementation requirements. Accordingly, the communication network 110 may represent any communication pathway between the various components of the networked computer environment 200.

As will be discussed with reference to FIGS. 4 and 5, the virtual meeting application 206 running a virtual meeting on the presenter computing device 202 and participant computing device 204 may also operate in a cloud computing service model, such as Software as a Service (SaaS), Platform as a Service (PaaS), or Infrastructure as a Service (IaaS). The servers running the virtual meeting application 206 on the devices participating in the virtual meeting may also be located in a cloud computing deployment model, such as a private cloud, community cloud, public cloud, or hybrid cloud.

The presenter computing device 202 may be a laptop computer, netbook computer, personal computer (PC), a desktop computer, or any programmable electronic device or any network of programmable electronic devices capable of hosting and running the presentation application 208 and virtual meeting application 206. The presenter computing device 202 may be used to create a presentation prior to a virtual meeting session, in which case presentation application 208 may be used to create presentation 210, and also to establish and maintain a virtual meeting session with virtual meeting application 206, which includes screen sharing features. The screen sharing feature of the virtual meeting application 206 may be configured to allow a presenter utilizing the presenter computing device 202, as shown in FIG. 2, to share the video that is displayed, including a computer desktop and software application windows that are opened, including a display of presentation 210 within the context of a virtual meeting session. The video that is shared may be a reproduction of the entire screen that is displayed locally at the computing device or a portion of the screen. In the case of a computing device with multiple screens, the virtual meeting application 206 may share any of the available screens. The presenter may configure the virtual meeting application 206 to display whatever screen is needed for the virtual meeting. As discussed with reference to FIG. 1, presenter computing device 202 may include computing device 100.

Participant computing device 204 may also include a virtual meeting application 206 that is displaying the screen that is shared by the presenter computing device 202 and configured to communicate with the other virtual meeting computer devices via the communication network 110, in accordance with an exemplary embodiment. The virtual meeting application 206 may provide a user interface in which a virtual meeting participant utilizing the participant computing device 204 may view other participants and the presenter in the virtual meeting, as well as receive the screen image that is shared by the presenter from the presenter computing device 202 (as shown in FIG. 2), according to the exemplary embodiments. Participant computing device 204 may be, for example, a mobile device, a telephone, a personal digital assistant, a netbook, a laptop computer, a tablet computer, a desktop computer, or any type of computing device capable of running a program and accessing a network. As discussed with reference to FIG. 1, the participant computing device 204 may include computing device 100.

The creation module 120 or display module 124, depending on the device and configuration, may operate in tandem with either or both of the virtual meeting application 206 and presentation application 208 on the participant computing devices 204 in the configuration shown in FIG. 2. The corresponding module may be discrete software that is separately loaded into the computing device or may be embedded within the virtual meeting application 206 or the presentation application 208 at the computing device, depending on the device and configuration. It will be appreciated by one of ordinary skill in the art that while the creation module 120 or display module 124 operate at a specific computing device, it is not required that the software is physically loaded or installed on the hardware but may be on a server for the virtual meeting session. The same is true for the virtual meeting application 206 itself as the virtual meeting session may be fully in the cloud and hosted by a virtual meeting server that is not shown.

In the example of FIG. 2, a presentation document, e.g., presentation 210, with embedded text, web links and graphics may be created by a presenter. For instance, a virtual meeting may be called for a specific reason that requires such a document to support an oral presentation and the speaker may create the document for the purpose of supporting their work. One of ordinary skill in the art will recognize that a presentation document may be created in many ways, most commonly with software applications specifically designed to create presentation documents, e.g., presentation application 208. During the creation of the presentation document, or alternatively once creation is complete, the presentation document may be inspected for embedded graphics or web links, which may be useful later in the context of the meeting such that participants may independently view them, or in the case of web links, have the actual link on the participant's screen to independently click the link and view the destination webpage. As an example of content that may be selected for extraction and storage, the presentation document may include a useful web link to a policy that will be discussed or another website with more detailed information that may be discussed during the virtual meeting session. In another example of useful content, the presentation document may include a table of statistics that may be highly relevant to the virtual meeting topic.

Any embedded graphics or web links that may be found may be extracted and stored in a database, e.g., content database 122, or in flash memory or temporary storage on a computing device for later retrieval. Such inspection, extraction and storage may be accomplished by creation module 120 using an appropriate algorithm, e.g., object recognition to find images of graphs, tables or other statistical diagrams, or text recognition to find text such as web links.

Creation module 120 may be embedded within a software application that may be used to create presentations, e.g., presentation application 208, as shown in FIG. 2, or may load and run separately on a computing device. Creation module 120 may be configured to find all graphics within a presentation document or may use filters to limit what is extracted. For instance, if any graphic or web link may be considered to include sensitive information, e.g., information that may be confidential or personal in nature, then that graphic or web link may be excluded from extraction or storage. In addition to this filtering, labels may also be created for the embedded graphics that may indicate a type of graphic that may be stored, such as "link" to indicate a web link or "table" to indicate a statistical table. These labels may be stored as metadata associated with the embedded graphics, e.g., an additional field in a database that includes the embedded graphics. The labels may be useful for navigating the database and locate embedded graphics of a desired type that may be provided by a participant in a virtual meeting to filter their view of the virtual meeting dashboard, as described below. In addition, a presenter may opt to only extract and store certain graphics by type, in which case only embedded graphics of a specific type may be extracted and stored.

It should also be noted that extraction and storage need not be limited to a presentation document that may be created prior to a virtual meeting. As described with respect to FIG. 3, if a participant unexpectedly becomes a presenter, the presentation that may be shared in the virtual meeting session may be scanned and any embedded graphics, subject to the filters described above, may be extracted and stored in the same way as the presentation document in the example of FIG. 2.

In the example shown in FIG. 2, a virtual meeting session may be established between a presenter computing device 202 and one or more participant computing devices 204, and a presenter may begin sharing a presentation with the participants. A presenter and participants may join a virtual meeting with an application, e.g., virtual meeting application 206, located on either a presenter computing device 202 or a participant computing device 204, which allows many participants to join virtually with a single presenter and several participants. While it is required for the virtual meeting itself to have a single host that the computing devices use for connection purposes, it is not required that the computing device that initiates the virtual meeting session, e.g., a meeting host, and the presenter be the same person, as both presenter computing device 202 and participant computing devices 204 have the capability to share a presentation in the virtual meeting session. Any person connected to the virtual meeting may be a presenter or a participant. For the purposes of distributing content in the virtual meeting, once a virtual meeting has begun and a person transmits a presentation via the virtual meeting application 206, the remaining computing devices are considered participant computing devices. The original host device may change roles such that they are a participant. As such, any of the modules in FIG. 1, including the display module 124, may exist on any computing device in the system, even if it is not currently operating on a specific computing device.

In an established virtual meeting session, an image of the presentation may be shared with all participants. In the embodiment of FIG. 2, this may be accomplished through virtual meeting application 206, which may project an image of the screen of the presenter computing device 202 onto the screens of all connected participants. However, it should be noted that a virtual meeting application 206 is not necessary for a virtual meeting session to be established. It is only required that a group of participants are connected to one another for the purpose of collaboration.

In the example of FIG. 2, once inspection of the presentation document is complete and all relevant embedded graphics or web links have been extracted and stored to memory, the embedded graphics themselves or a list of graphics with links to the actual files may be transmitted to all participants of the virtual meeting session. The transmission may be done at any time, including immediately upon storage of the embedded graphics or, alternatively, at the time that a virtual meeting session may be established. As an example of immediate transmission, if a presentation were to be linked to a specific virtual meeting that may have been called and there may be participants associated with the virtual meeting session, along with contact details, then participant contact information may be used to transmit the embedded graphics to participant computing devices 204. In another transmission example, the embedded graphics may be stored on the presenter computing device 202 and once a participant connects to an established virtual meeting session, the embedded graphics may be transmitted to the corresponding participant computing device 204.

Once the participant computing device 204 has the embedded graphics from the presentation document, display module 124 may be used to overlay a virtual meeting dashboard on the shared screen of the virtual meeting session. Alternatively, the virtual meeting dashboard may be opened as a separate window on the participant computing device 204. The virtual meeting dashboard may display the embedded graphics that the participant computing device 204 may have received so that the participant may independently have the relevant information. There may be a default setting to display all received information within the virtual meeting dashboard with a participant having the option to configure the virtual meeting dashboard to filter what may be displayed. As described below, this may include limiting the view to only those graphics that are currently displayed on the shared screen of the virtual meeting session. In another embodiment, a participant may configure the virtual meeting dashboard to only display embedded graphics of a certain type, which may be specified by the participant. It should be noted that while FIG. 2 shows display module 124 as embedded in the virtual meeting application 206, display module 124 may also load and run separately from any other software, in a similar way to creation module 120.

As an example of the display on the participant computing device 204, a participant in the virtual meeting may be viewing a presentation and the screen may be partitioned such that a sidebar may be opened that includes a list of the content that may be available from the presentation, e.g., links or tables or graphics. In this example, the participant would be allowed to access any of these items directly, without the need to search or ask other participants to assist with receiving the content. This may include clicking on the text if the graphic is a web link to access the destination directly, in which case the destination webpage may open within the virtual meeting dashboard or in a separate window. In an embodiment, a web browser running on the participant computing device 204 may be opened to take the participant to the destination of the web link. If the embedded graphic were a statistical diagram or some other image, the virtual meeting dashboard may display the actual image within the virtual meeting dashboard or show a thumbnail image or some text that may be linked to the actual image within the database that has been transmitted to the participant computing device 204. In the case of a diagram or image, opening the embedded graphic may be accomplished in tandem with the display module 124, virtual meeting application 206, any combination thereof or with an appropriate separate software application that may be designed to open the diagram or image. The virtual meeting dashboard may be a separate display on the screen of the participant computing device 204 to access embedded graphics independently of the presentation within the shared screen.

Figure 3:
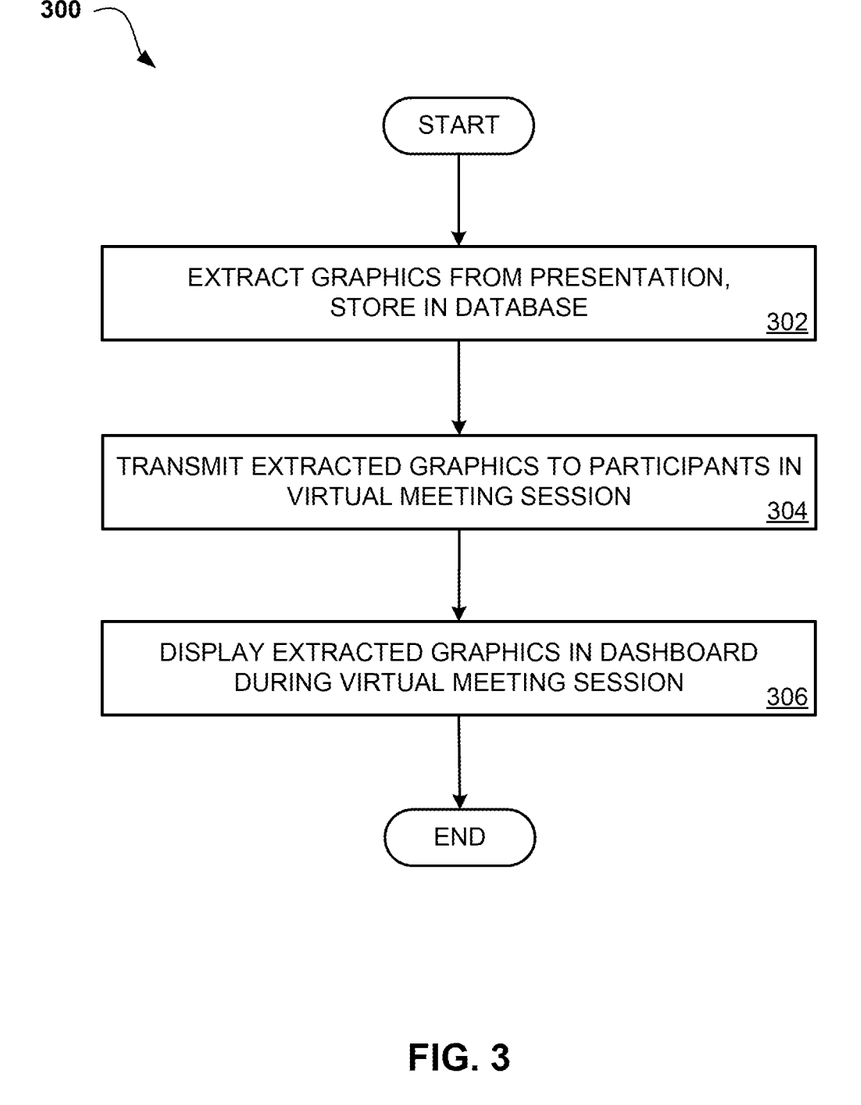
FIG. 3 depicts a flow chart diagram of a process to in accordance with one or more embodiments.

Referring to FIG. 3, an operational flowchart illustrating a process 300 to distribute content in a virtual meeting session is depicted according to at least one embodiment. At 302, embedded graphics in a presentation may be extracted and stored in a database, e.g., content database 122. In an embodiment, this step may be accomplished in the presenter computing device 202 while a presentation for an upcoming virtual meeting is being created. The presentation may be inspected for the presence of multiple types of embedded graphics, which may consist of web links, i.e., text data in the form of an address or URL that may be clicked on to take a user to the address or URL, or graphical objects such as statistical charts, tables or graphs. In addition to the actual graphic, related information about the graphic, e.g., type of graphic, may also be collected and stored as metadata along with the graphic in the database. As an example, if a web link is found in the presentation, the text of the link may be extracted and an appropriate designation, such as "link," may be added in a separate database field that is associated with the web link, i.e., metadata. When stored in the database, this metadata may allow the database to be searched and/or sorted by specific designations.

In an embodiment, the embedded graphics may be classified according to a type using a machine learning classification model. One or more of the following machine learning algorithms may be used to classify the events: logistic regression, naive Bayes, support vector machines, artificial neural networks and random forests. In an embodiment, an ensemble learning technique may be employed that uses multiple machine learning algorithms together to assure better prediction when compared with the prediction of a single machine learning algorithm. Each type used in the classification results may be equivalent to a graphical representation that may be useful to participants. Examples of types may include a web link, e.g., text that defines an address or URL that may be followed to seek useful information, a statistical diagram such as a graph or table of data that a participant may find relevant or useful to the discussion in the virtual meeting, or in some cases an image or video. The results of the determination of a type may be stored with the embedded graphic as associated metadata.

In a further embodiment, it may be determined whether embedded graphics include sensitive information. Examples of sensitive information may include any personal information that may not be relevant to a virtual meeting discussion or company's confidential information in a context of a virtual meeting with some or all participants who are not employees of the company. In this embodiment, only information classified as not sensitive may be extracted and therefore also stored and/or transmitted to participants.

The decisions for determining whether information is sensitive, e.g., filtering embedded graphics from extraction, may be set by an owner of the sensitive information, who may be either the presenter or the participant in a virtual meeting, or with training data that is put into a machine learning classification model. The ability to mark information as sensitive or not sensitive with respect to the machine learning classifier may be configured for each embedded graphic. In an initial state, extraction, and therefore storage and/or transmission, of all embedded graphics may be disabled. This default initial setting means the owner of the potentially sensitive information is required to consent to any information being extracted and stored or transmitted over a network.

The information owner may check the embedded graphics by inspecting the presentation during creation or the stored embedded graphics via an appropriate user interface (UI) and confirm what information may be extracted and stored or transmitted to others, and therefore what information may be classified as sensitive. The information owner may also approve extraction, storage or transmission of certain information, or manually mark that information according to sensitivity. If the information owner approves extraction and storage or transmission via these filter settings, only the information that is approved may be extracted. Any sensitive information will still be classified as such and blocked from extraction or storage or transmission.

It should be noted that the information owner is free to make these decisions at any time and change what they choose to be sensitive information as the sensitive nature of information may change over time. These settings are permanently retained to keep the machine learning classifier updated with the latest information and also allow the owner of the information complete control over their informed consent to use sensitive information in the distribution of content.

At 304, any embedded graphics, along with available metadata, that may be available in the database may be transmitted to the participants in the virtual meeting. It should be noted that the transmitting of the embedded graphics and associated metadata may be accomplished at any time once a graphic has been stored. It is not required that a presentation be fully complete before participants are sent embedded graphics from the presentation, nor is it required that the transmission of the embedded graphics occur at the same time of after a virtual meeting session may be established. In the embodiment of FIG. 2, the presentation may be created before the virtual meeting and the presentation may be inspected for embedded graphics and the creation module 120 may collect several embedded graphics of various types and populate a database with files and associated metadata. Then, automatically, the participants in the virtual meeting session may be identified using the contact details of the virtual meeting and the contents of the database may be sent to the identified participants. However, it is not required that the process be this orderly. For instance, a participant may unexpectedly wish to make a presentation in a virtual meeting. Once they share the presentation, the image on the shared screen may be scanned for embedded graphics of appropriate types and these graphics may be stored in a database, e.g., content database 122, along with metadata to identify and sort the embedded graphics. The contents may then be transmitted to all participants in the virtual meeting but one of ordinary skill in the art will recognize that in this embodiment, the storing step may not be necessary, and the embedded graphics and metadata may be immediately sent to all participants. In another embodiment, the embedded graphics and metadata may be sent to participants at the time of connection to the virtual meeting session, which may be more efficient than being restricted to a preset list of identified participants and may also assure that the most up to date information is available to transmit to participants.

At 306, the embedded graphics that were extracted in 302 and transmitted in 304 may be displayed to the participants in the virtual meeting in the form of a virtual meeting dashboard that may be customized by participants and which may be integrated into the participant's view of the presentation. For example, if the virtual meeting session is being hosted in a virtual meeting application, the virtual meeting dashboard may appear in the virtual meeting application window in which the meeting is being hosted but this is not required. The virtual meeting dashboard may be displayed in a separate window that may be created for the purpose of the virtual meeting dashboard, as determined by the display module 124.

In an embodiment, each participant may configure the virtual meeting dashboard on the participant device to display a "cumulative view" such that all embedded graphics that may have been extracted from the entire presentation are available to a participant and may be included in the virtual dashboard. This cumulative view may improve efficiency since the embedded graphics within the virtual meeting dashboard are not limited to a page that is currently being shown to the participants through the virtual meeting application 206, i.e., the current image of the presentation on the screen of the participant device.

However, in a further embodiment, the participant may also choose to configure the virtual meeting dashboard to limit the display to only those graphics that are currently displayed on the screen of the participant computing device. In this embodiment, a screen capture of the participant computing device may be obtained where the current contents of the screen may be analyzed using appropriate recognition algorithms, e.g., text recognition algorithms in the case of web links or object recognition in the case of a statistical diagram, to determine which embedded graphics are currently being displayed on the screen of the participant computing device. The embedded graphics that have been extracted and stored may then be checked to see if the embedded graphic is currently on the screen of the presenter computing device. If the embedded graphic is on the screen, the embedded graphic may be added to the virtual meeting dashboard and displayed to the participant. If the embedded graphic is not on the screen of the participant computing device, then it may be excluded from the virtual meeting dashboard.

In an embodiment, each participant may also configure their virtual meeting dashboard individually to limit their view by type of embedded graphic. In such a case, an account or profile that is specific to the participant with respect to a virtual meeting dashboard may be kept and modified to filter the graphics that may appear on the participant's dashboard. In this embodiment, a participant may indicate in their account or profile which types of embedded graphic they prefer to see in their virtual meeting dashboard. This preferred type may be compared to the stored embedded graphics, i.e., the content database 122, and only embedded graphics including a type that matches the preferred type may be displayed in the virtual meeting dashboard. For instance, a participant may determine that only web links and no statistical diagrams such as tables or graphs should appear in the participant's virtual meeting dashboard. In this instance, the content database 122 may be inspected and only those graphics that also include a designation of "link" may be displayed in the virtual meeting dashboard of the participant.

It should be noted that the participant is free to make any decisions about the information to be included in the virtual meeting dashboard at any time and change what they choose to view as the account or profile may be saved to retain the latest information and also allow the participant complete control over their virtual meeting dashboard settings.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
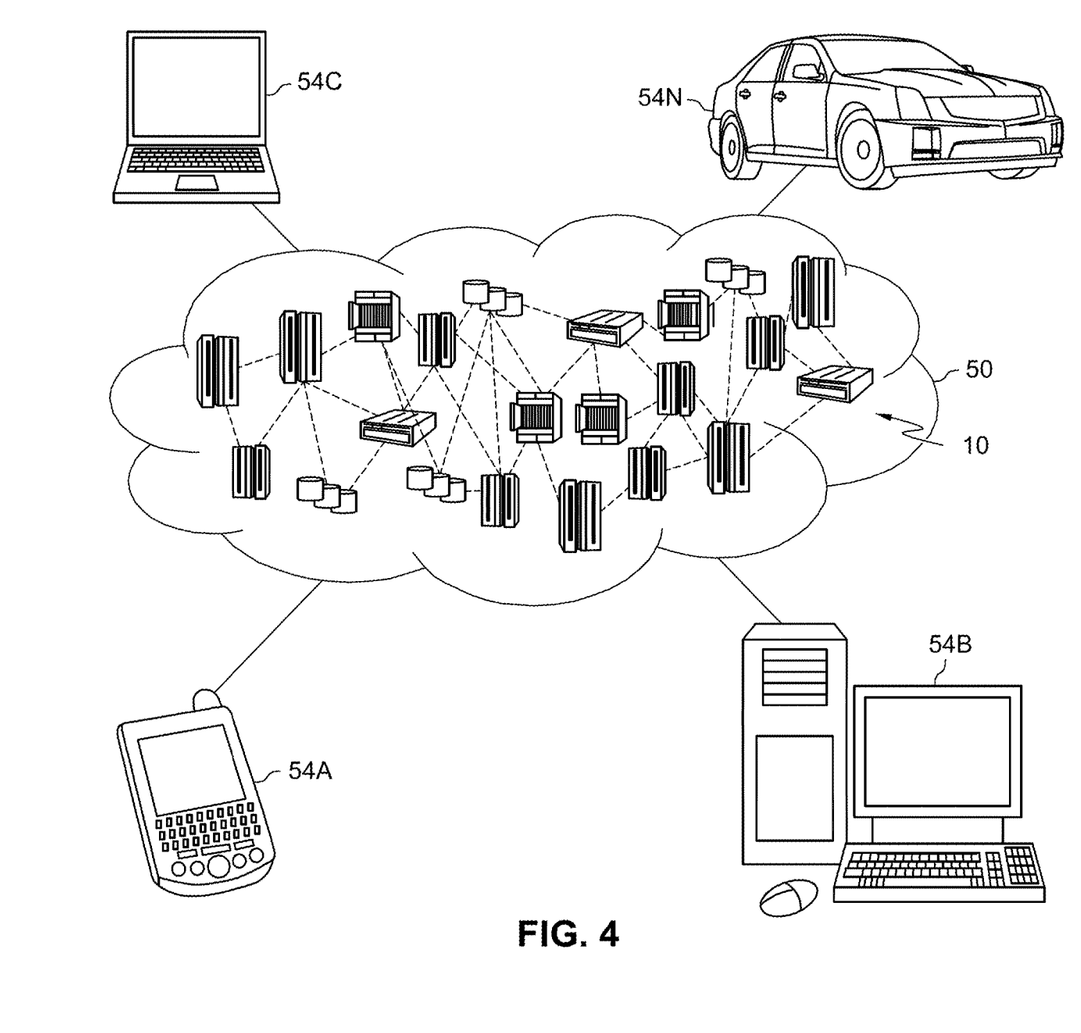
FIG. 4 depicts a cloud computing environment according to an exemplary embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
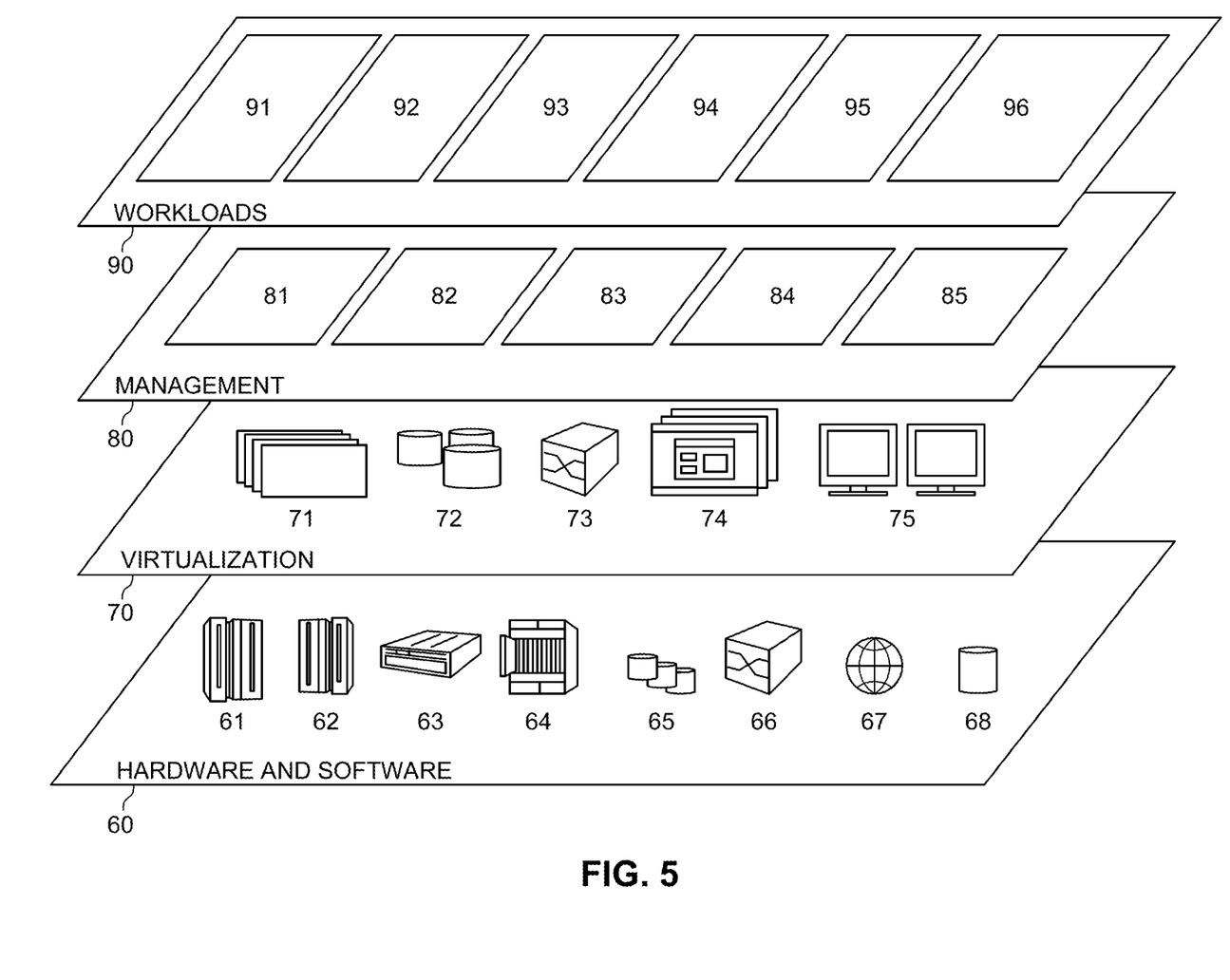
FIG. 5 depicts abstraction model layers according to an exemplary embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and distribution of content 96. Distribution of virtual content may describe extracting embedded graphics of any type and displaying the embedded graphics in a virtual meeting dashboard, as well as transmitting the embedded graphics to participants of the virtual meeting.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributing graphical content from a shared presentation in a virtual meeting session, the method comprising:
    obtaining a presentation file from a presenter computing device, wherein the presentation file includes the graphical content from the shared presentation;
    identifying an embedded graphic in the graphical content of the presentation file, wherein the embedded graphic is selected from a group consisting of web links, images and video data;
    extracting the embedded graphic from the presentation file and transmitting the embedded graphic to a participant computing device; and
    displaying a virtual meeting dashboard in the virtual meeting session, wherein the virtual meeting dashboard includes the embedded graphic.

2. The computer-implemented method of claim 1, wherein the identifying the embedded graphic in the graphical content of the presentation file further comprises:
    determining of that the embedded graphic does not include sensitive information.

3. The computer-implemented method of claim 1, further comprising:
    determining a type of embedded graphic for the embedded graphic; and
    storing the type of embedded graphic in a content database as metadata associated with the embedded graphic.

4. The computer-implemented method of claim 3, wherein the determining the type of embedded graphic uses a machine learning model to classify the embedded graphic by the type of embedded graphic.

5. The computer-implemented method of claim 1, further comprising connecting the participant computing device to a content database when the participant computing device connects to the virtual meeting session.

6. The computer-implemented method of claim 3, wherein the displaying the virtual meeting dashboard in the virtual meeting session further comprises,
    in response to a participant indicating a preferred type of embedded graphic that matches the type of embedded graphic, adding the embedded graphic to the virtual meeting dashboard.

7. The computer-implemented method of claim 1, wherein the displaying the virtual meeting dashboard in the virtual meeting session further comprises:
    obtaining a screen image of the participant computing device;
    determining that the screen image includes the embedded graphic; and
    adding the embedded graphic in to the virtual meeting dashboard.

8. A computer system for distributing graphical content from a shared presentation in a virtual meeting session, the computer system comprising:

one or more processors, one or more computer-readable memories, and one or more computer-readable storage media;

program instructions, stored on at least one of the one or more computer-readable storage media for execution by at least one of the one or more processors via at least one of the one or more memories to obtain a presentation file from a presenter computing device, wherein the presentation file includes the graphical content from the shared presentation;

program instructions, stored on at least one of the one or more computer-readable storage media for execution by at least one of the one or more processors via at least one of the one or more memories, to identify an embedded graphic in the graphical content of the presentation file, wherein the embedded graphic is selected from a group consisting of web links, images and video data;

program instructions, stored on at least one of the one or more computer-readable storage media for execution by at least one of the one or more processors via at least one of the one or more memories, to extract the embedded graphic from the presentation file and transmit the embedded graphic to a participant computing device; and program instructions, stored on at least one of the one or more computer-readable storage media for execution by at least one of the one or more processors via at least one of the one or more memories, to display a virtual meeting dashboard in the virtual meeting session, wherein the virtual meeting dashboard includes the embedded graphic.

9. The computer system of claim 8, wherein the identifying the embedded graphic in the graphical content of the presentation file further comprises:
determining that the embedded graphic does not include sensitive information.

10. The computer system of claim 8, further comprising:
program instructions, stored on at least one of the one or more computer-readable storage media for execution by at least one of the one or more processors via at least one of the one or more memories, to determine a type of embedded graphic for the embedded graphic; and
program instructions, stored on at least one of the one or more computer-readable storage media for execution by at least one of the one or more processors via at least one of the one or more memories, to store the type of embedded graphic in a content database as metadata associated with the embedded graphic.

11. The computer system of claim 10, wherein the determining the type of embedded graphic uses a machine learning model to classify the embedded graphic by the type of embedded graphic.

12. The computer system of claim 8, further comprising program instructions, stored on at least one of the one or more computer-readable storage media for execution by at least one of the one or more processors via at least one of the one or more memories, to connect the participant computing device to a content database when the participant computing device connects to the virtual meeting session.

13. The computer system of claim 10, wherein the displaying the virtual meeting dashboard in the virtual meeting session further comprises,
in response to a participant indicating a preferred type of embedded graphic that matches the type of embedded graphic, adding the embedded graphic in to the virtual meeting dashboard.

14. The computer system of claim 8, wherein the displaying the virtual meeting dashboard in the virtual meeting session further comprises:
obtaining a screen image of the participant computing device;
determining that the screen image includes the embedded graphic;
adding the embedded graphic in to the virtual meeting dashboard.

15. A computer program product for distributing graphical content from a shared presentation in a virtual meeting session, the computer program product comprising:
one or more computer-readable storage media;
program instructions, stored on at least one of the one or more computer-readable storage media, to obtain a presentation file from a presenter computing device, wherein the presentation file includes the graphical content from the shared presentation;
program instructions, stored on at least one of the one or more computer-readable storage media, to identify an embedded graphic in the graphical content of the presentation file, wherein the embedded graphic is selected from a group consisting of web links, images and video data;
program instructions, stored on at least one of the one or more computer-readable storage media, to extracting the embedded graphic from the presentation file and transmit the embedded graphic to a participant computing device; and
program instructions, stored on at least one of the one or more computer-readable storage media, to display a virtual meeting dashboard in the virtual meeting session, wherein the virtual meeting dashboard includes the embedded graphic.

16. The computer program product of claim 15, wherein the identifying the embedded graphic in the graphical content of the presentation file further comprises:
determining that the embedded graphic does not include sensitive information.

17. The computer program product of claim 15, further comprising:
program instructions, stored on at least one of the one or more computer-readable storage media, to determine a type of embedded graphic for the embedded graphic; and
program instructions, stored on at least one of the one or more computer-readable storage media, to store the type of embedded graphic in a content database as metadata associated with the embedded graphic.

18. The computer program product of claim 17, wherein the determining the type of embedded graphic uses a machine learning model to classify the embedded graphic by the type of embedded graphic.

19. The computer program product of claim 17, wherein the displaying the virtual meeting dashboard in the virtual meeting session further comprises,
in response to a participant indicating a preferred type of embedded graphic that matches the type of embedded graphic, adding the embedded graphic to the virtual meeting dashboard.

20. The computer program product of claim 15, wherein the displaying the virtual meeting dashboard in the virtual meeting session further comprises:
obtaining a screen image of the participant computing device;
determining that the screen image includes the embedded graphic;

adding the embedded graphic in to the virtual meeting dashboard.

\* \* \* \* \*